June 29, 1965  W. J. MOORHOUSE ETAL  3,191,313
MEASUREMENT AND CONTROL OF MOISTURE
Filed June 20, 1961  2 Sheets-Sheet 1
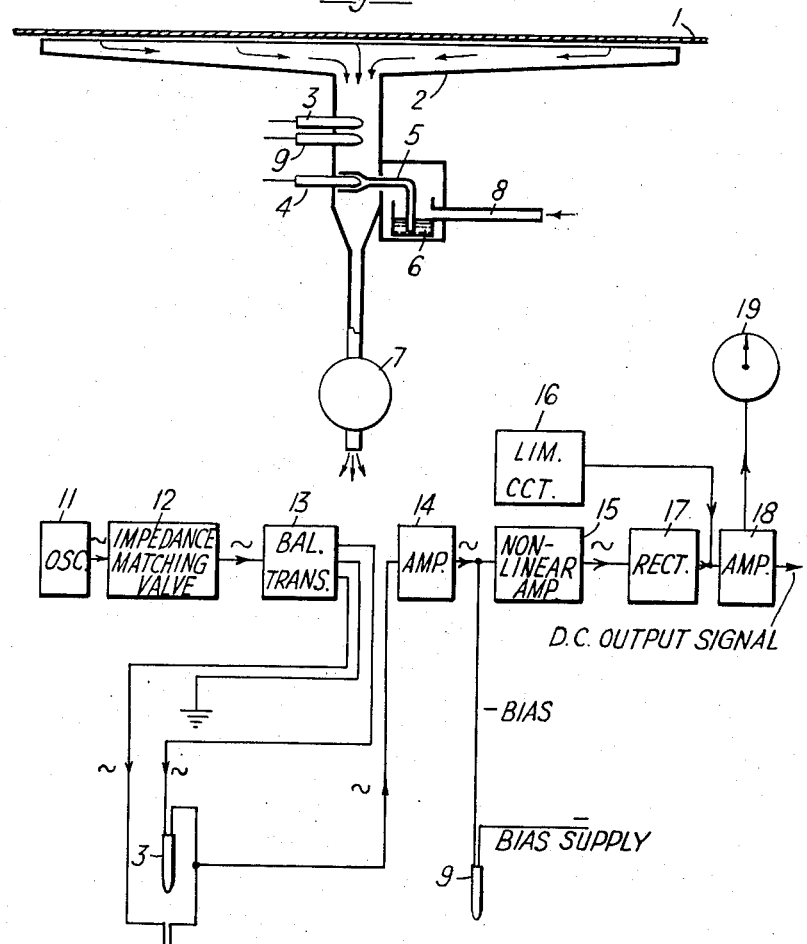
Inventors
William Joseph Moorhouse, Gowan Coendoz Rogers &
George Charles Lee Campbell
By Mead, Browne, Schuyler & Beveridge,
Attorneys

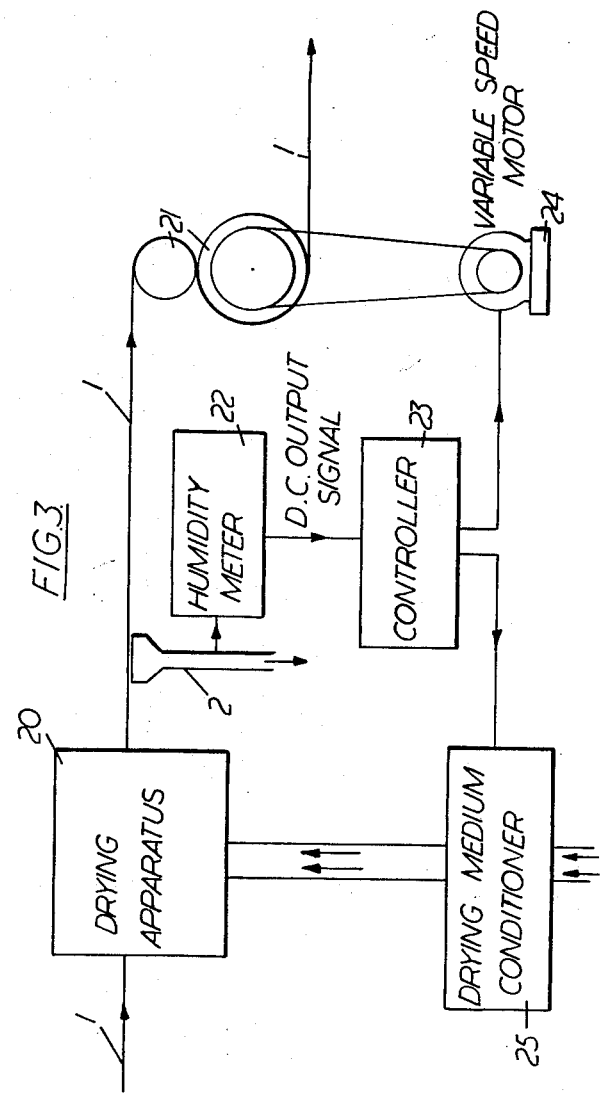

United States Patent Office 3,191,313
Patented June 29, 1965

3,191,313
MEASUREMENT AND CONTROL OF MOISTURE
William Joseph Moorhouse, Nabwood, Shipley, and Gowan Coendoz Rogers and George Charles Lee Campbell, Bradford, England, assignors to The Bradford Dyers' Association Limited
Filed June 20, 1961, Ser. No. 118,368
Claims priority, application Great Britain, June 21, 1960, 21,744/60
4 Claims. (Cl. 34—52)

This invention relates to the measurement of the moisture content of materials, and more particularly of air-permeable materials such as cloth and the like, for the purpose of controlling that content.

In practice it is often not important to measure the moisture content of a material in absolute terms, but it may be desired to control this moisture content so that the material will be in approximate moisture equilibrium with the atmosphere which will ultimately surround it. This may be done by measuring the relative humidity of air in moisture equilibrium with the material and adjusting the moisture content so that this relative humidity corresponds to that of the atmosphere in which the material will find itself. Thus measurement of the relative humidity of air in moisture equilibrium with it is often a sufficient indication as to the moisture content of a material.

According to one prior proposal a method of automatically regulating a machine for changing the moisture content of material moving in continuous length through the machine comprises locating the moisture-sensitive portion of humidity detector means closely adjacent to the material so as substantially directly to detect change in humidity of the air at the surface of the material, and using the output of the humidity detector means to effect automatic regulating adjustment of the machine. Hitherto, however, it has not been possible to operate this method satisfactorily, as the humidity detectors available have been too insensitive and too slow in response or they have an inadequate range to take account of changes in the humidity of the material being dried.

According to the present invention we measure the relative humidity of air in moisture equilibrium with an air-permeable material for the purpose of controlling its moisture content by means of electrical wet and dry bulb thermometers.

By an electrical thermometer we mean a device that responds to changes in temperature in a way that can be directly measured electrically, and we include in this term thermistors, electric resistance thermometers, and thermocouples. We prefer to use a pair of thermistors, most suitably of the bead type, owing to their small bulk and high response to temperature changes, but other types of electric thermometer can be used if their lower response and greater bulk can be tolerated.

A suitable apparatus for determining the moisture content comprises a pair of identical electrical thermometers, means for maintaining one of these thermometers wet, means for drawing air from contact with the material past and in contact with both thermometers, and means for converting into a single signal the difference between the electrical responses of the two thermometers to the moisture content of the air flowing in contact with them. This single signal may then be fed to a meter from which an operator may see the relative humidity and make appropriate manual adjustments to apparatus affecting the moisture content of the material. Alternatively, where for example the material passes through a drying apparatus, the signal may be fed to automatic means for controlling the speed of travel of the material through the apparatus.

The present invention is particularly useful for controlling the moisture content of textile materials moving in continuous length through a drying apparatus, but may also be used for controlling the moisture content of other air-permeable materials such as bales of cotton, wool, tobacco, hay and silage. Such materials may, for example, be stored in a container, and their moisture content may be controlled by suitable alterations in the temperature or humidity of air passed through the container, or in the speed at which air is passed through the container. An absolute measure of the moisture content of such materials is also of value when determining the price at which they are to be sold.

The preferred way of carrying out the invention will now be illustrated with reference to the accompanying drawings, in which:

FIGURE 1 is a diagrammatic view of apparatus for measuring the humidity of the air drawn from or through a textile material leaving a drying machine;

FIGURE 2 is a diagrammatic representation of the electrical circuit necessary for obtaining this measurement and converting it to the relative humidity at a standardised temperature; and FIGURE 3 illustrates how this measurement can be applied to the automatic control of the moisture content of the material.

In FIGURE 1, 1 represents a width of textile material in section as it leaves a drying apparatus. Air is slowly drawn from or through the material by a suction pump 7 into an air-intake hood 2 and from there over a "dry" thermistor 3, that is a thermistor bead housed in a thin glass bulb, and over a "wet" thermistor 4, that is an identical thermistor bead also housed in a thin glass bulb which is kept moist by means of a wick 5 dipping into a reservoir 6 containing water. Water is supplied through a pipe 8 to make up for that lost by evaporation. When the water reaches the desired level in the tank, the supply is interrupted automatically by electrical means (not shown). A temperature compensating thermistor 9 is located close to the "dry" thermistor 3 so that these two thermistors remain at the same temperature.

The speed of the air must be slow (preferably below 1 ft. per minute) as it is drawn from the material 1, since otherwise ambient air will be included and measured together with the air which has been carried along by the material and is in moisture equilibrium with it. The speed of the air as it passes the thermistors 3 and 4 is conveniently about 3 to 5 ft. per second.

Care must be taken that the temperature of the air does not appreciably alter before it reaches the thermistors as this will affect the relative humidity.

The temperature of the air is measured by the dry bulb 3 and the depression of the wet bulb 4 below this temperature is also measured. These are combined electrically in a suitable manner to give the relative humidity. The depression is observed at the temperature of the material which may be a variable and non-standard temperature and the relative humidity reading is preferably adjusted to a normal ambient temperature usually standardised at 70° F. The result is the relative humidity of the air with which the material would be in moisture equilibrium at the standardised temperature, although it may have been measured at a different temperature. This adjustment is conveniently made electrically using circuits including the second dry thermistor 9.

This apparatus can readily be modified to measure the moisture content of baled materials, by replacing the hood 2 by a hollow probe which can be pushed into a bale.

The relative humidity for textile materials varies a little with temperature for a constant weighed moisture content. This variation is also preferably corrected to the standardised temperature and this is conveniently done in the calibration of the measuring instrument.

The result is independent of the temperature at which the measurement was made and of the type of material, of its weight or thickness or of any material with which it may have ben impregnated, or of any other extraneous matter which it may contain, either hygroscopic or otherwise.

The electrical circuit employed can take various forms, but the preferred form is illustrated in FIGURE 2.

An oscillator 11 provides a 1,000 cycles/second voltage which is fed through an impedance matching valve 12 into a balanced transformer 13. The transformer 13 gives two equal anti-phase outputs which are fed respectively to the dry thermistor 3 and the wet thermistor 4. The output from the thermistors, which is the vector sum of the anti-phase inputs, is thus dependent on the difference in resistance between the "dry" and "get" thermistors. For example, if both thermistors have equal resistance the output is zero and the humidity is at its maximum.

As both thermistors alter resistance equally with change of temperature, but only the depression of the "wet" thermistor changes resistance with humidity, the amplitude of the output is proportional to humidity.

This output is amplified by an amplifier 14, and is then fed to a non-linear amplifier 15, the gain of which is affected by the amount of negative bias applied to it. This bias is varied by the temperature compensating thermistor 9. By means of the bias controlled by the thermistor 9 the humidity reading obtained are corrected to the standardised temperature. The signal from the non-linear amplifier 15 is then passed through a rectifier 17 and an amplifier 18, which gives a relative humidity reading directly on a meter 19 and a D.C. voltage which can be fed out to a control unit by which the moisture content of the material can be controlled, for example by altering the speed and/or temperature of the drying apparatus. Limiter circuit 16, at the output of rectifier 17, compensates for deviations in the output of the apparatus.

FIGURE 3 illustrates the material 1 being drawn through a drying apparatus 20 by a pair of rollers 21. The air-intake 2 is shown diagrammatically, while the rest of the apparatus for obtaining the relative humidity measurement is indicated generally as the humidity meter 22. The D.C. output signal obtained from this is fed into a controller 23. This can either alter the speed of a variable motor 24 which drives the rollers 21, or can control a drying medium conditioner 25, which, for example, controls the temperature of air supplied to the drying apparatus. Both methods of control can also be exercised simultaneously.

As stated above, the relative humidity of the atmosphere with which the material is in moisture equilibrium is a measure of the adequacy of drying, and is indicated by the meter, but if the percentage moisture content by weight is required, this can be obtained from published data comparing humidity and moisture content for a given material in moisture equilibrium with the atmosphere surrounding it. It will vary widely for different materials.

An important advantage of the wet and dry bulb humidity method is that it very rapidly recovers from 100% humidity if wet material should come through, for example on starting up a drying apparatus.

We claim:

1. Apparatus for measuring the moisture content of material comprising
    first and second thermistor thermometers,
        means for maintaining one of said thermistor thermometers wet,
    a compensating thermistor thermometer,
        means for drawing air in moisture equilibrium with the material from about the material at a low rate of speed and past said thermometers,
    a bridge circuit for converting the electrical response of said first and second thermistor thermometers to a single electrical signal,
    a nonlinear amplifier,
    means for applying said single electrical signal to said nonlinear amplifier, and
    means connecting said compensating thermistor thermometer so as to control the gain of said nonlinear amplifier.

2. Apparatus as defined in claim 1 wherein said means for drawing air comprises a suction pump and the rate in which said suction pump draws air from contact with the material is below one foot per minute.

3. An apparatus for measuring the moisture content of material comprising:
    first, second and third electrical thermometers,
    means for maintaining said third thermometer wet,
    suction means for drawing air from contact with the material at a rate below one foot per minute,
    said first, second and third electrical thermometers being in the path of the flow of air from said material,
    means for converting into a single electrical signal the difference between the electrical responses of said first and said third electrical thermometers,
    an electronic amplifier,
    means for applying said single signal to said amplifier,
    and means for controlling the gain of said amplifier as a function of the output of said second electrical thermometer so as to correct the humidity reading for any temperature to a standardized temperature.

4. An apparatus for controlling the moisture content of material comprising
    a drying apparatus, including a source of drying medium and drive means for moving the material through the drying apparatus,
    means for measuring the moisture content of the material as it leaves the drying apparatus including
        a pair of identical electrical thermometers,
            means for maintaining one of these thermometers wet,
            means for drawing air in moisture equilibrium with the material as it leaves the drying apparatus at a controlled rate from the material past and in contact with both thermometers,
    means for converting into a single electrical signal the difference between the electrical responses of the two thermometers corresponding to the moisture content of the air flowing in contact with them,
    an amplifier,
    means for applying said single signal to said amplifier,
    means for controlling the gain of said amplifier in accordance with the temperature of the air flowing in contact with said thermometers so that the signal at the output of said amplifier is relatively independent of the temperature of the material
    and means responsive to the signal at the output of said amplifier for changing the rate of drying of the material as it passes through said drying apparatus.

References Cited by the Examiner

UNITED STATES PATENTS

| | | | |
|---|---|---|---|
| 1,926,292 | 9/33 | Kruse | 34—52 |
| 2,142,789 | 1/39 | Klages | 76—336.5 |
| 2,440,648 | 4/48 | Walter et al. | 34—68 |
| 2,501,377 | 3/50 | Cherry | 73—338 |
| 2,548,550 | 4/51 | Minter | 236—44 X |
| 2,559,713 | 7/51 | Dunski | 34—52 |
| 2,603,972 | 7/52 | Kahn | 73—336.5 |
| 2,638,783 | 5/53 | Rittner | 73—336.5 |
| 2,915,898 | 12/59 | Van Luik | 73—29 |

PERCY L. PATRICK, *Primary Examiner.*

NORMAN YUDKOFF, *Examiner.*